United States Patent [19]

Kasper

[11] Patent Number: 5,013,903
[45] Date of Patent: May 7, 1991

[54] LIGHTWAVE RECEIVER HAVING DIFFERENTIAL INPUT

[75] Inventor: Bryon L. Kasper, Allentown, Pa.

[73] Assignee: AT&T Bell Laboratories, Murray Hill, N.J.

[21] Appl. No.: 485,195

[22] Filed: Feb. 26, 1990

[51] Int. Cl.$^5$ .............................................. H01J 40/14
[52] U.S. Cl. ........................ 250/214 A; 250/214 RC; 455/619
[58] Field of Search ........ 250/214 R, 214 A, 214 RC; 307/311, 355, 350; 330/59, 308; 455/619

[56] References Cited

U.S. PATENT DOCUMENTS

| | | | |
|---|---|---|---|
| 3,906,389 | 9/1975 | Matsumoto et al. | 330/59 |
| 4,139,767 | 2/1979 | Witkowicz | 250/214 R |
| 4,679,251 | 7/1987 | Chown | 455/619 |
| 4,713,841 | 12/1987 | Porter et al. | 455/619 |

*Primary Examiner*—David C. Nelms
*Assistant Examiner*—Que Tan Le
*Attorney, Agent, or Firm*—James H. Fox

[57] ABSTRACT

A lightwave receiver, suitable for CATV applications, includes an input photodiode that is capacitively coupled to the differential inputs of a balanced amplifier. Biasing of the photodiode may be achieved by connecting the photodiode in series between a pair of resistors, with the differential inputs being taken from either side of the photodiode. This arrangement avoids the use of a transformer, which exhibits considerable high frequency loss, thereby avoiding the bandwidth limitation inherent with a transformer.

7 Claims, 2 Drawing Sheets

LIGHTWAVE RECEIVER HAVING DIFFERENTIAL INPUT

BACKGROUND OF THE INVENTION

1. Field of the Invention

The present invention relates to a receiver suitable for lightwave applications.

2. Description of the Prior Art

Optical transmission systems are finding use in a wide variety of applications that once relied on metallic conductors or radio links. For example, closed-area television (CATV) systems are now being implemented with optical fibers instead of coaxial cables. To allow for the transmission of a large number of channels with minimum bandwidth and at low cost, amplitude modulation (AM) or other analog techniques may be used for modulating the optical signal. When receiving the AM signal, low distortion amplifiers are required. These typically use a balanced amplifier configuration to cancel second-order non-linearities. For example, the amplifier circuit of a typical trunk amplifier used in analog CATV lightwave systems is shown in FIG.3. A p-i-n photodiode can be connected to the amplifier input transformer, as shown, to form an optical receiver. However, a disadvantage of this input connection using a transformer is that the transformer has considerable loss, which may limit the noise figure of the receiver. Furthermore, the loss increases at very high and very low frequencies, thereby limiting the bandwidth.

SUMMARY OF THE INVENTION

I have invented an lightwave receiver having a photodetector capacitively coupled to the differential inputs of an amplifier. Means are included to provide a DC bias to the photodetector.

DETAILED DESCRIPTION

Figure 1:
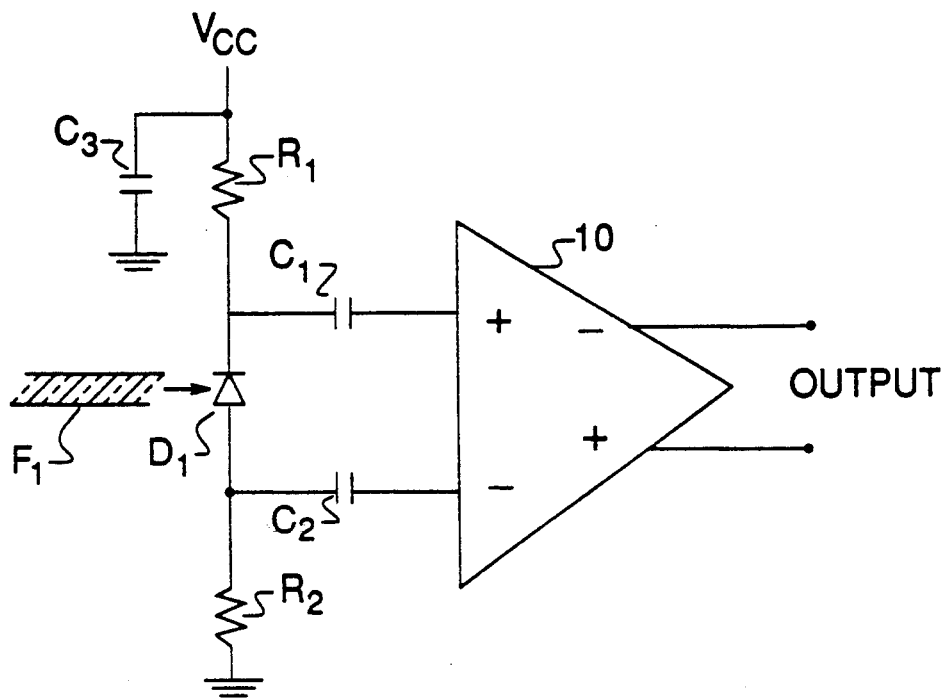
FIG. 1 shows an illustrative embodiment of the present invention.

Referring to FIG. 1. a photodiode D1 is optically coupled to an optical fiber F1 or other optical transmission medium. The cathode of D1 is connected to a first input of the balanced amplifier (10) through capacitor C1, and the anode of D1 is connected to a second input of the balanced amplilfier through capacitor C2. A bias voltage is applied to D1 through resistors R1 and R2. By making these resistors approximately equal in resistance, the balance condition of amplifier 10 may be maintained. Note that both R1 and R2 are connected to ground: R2 is directly connected to ground, while R1 is AC connected through capacitor C3 to ground. In one current design, the values of R1 and R2 are 3 kilohms, whereas C1 and C2 are 0.01 mf, and C3 is 0.1 mf. However, other values are possible.

In another embodiment, the resistors R1 and R2 in FIG. 1 may be replaced by inductors (not shown). This has the advantage of reducing the thermal noise associated with the resistors. Alternatively, a first inductor may be placed in series with R1, and a second inductor placed in series with R2. While the values of R1 and R2 are typically equal, that need not always be the case. For example, if the values of R1 and R1 are large with respect to the input impedance of the balanced amplifier, then the proper DC bias may be obtained without upsetting the balance of the amplifier.

Furthermore, it is possible to implement the present invention using only one input capacitor, for example C1. In that case, the other electrode of the photodetector (e.g., the anode of D1), and its associated bias resistor (R2) may be directly connected to the other input of the amplifier. The DC bias voltage across the differential inputs may then be made equal by connecting a large value resistor, or alternatively an inductor (not shown), across the inputs. Either of the cases of one or two input capacitors is considered to provide "capacitive coupling" to the amplifier inputs as used herein.

Figure 3:
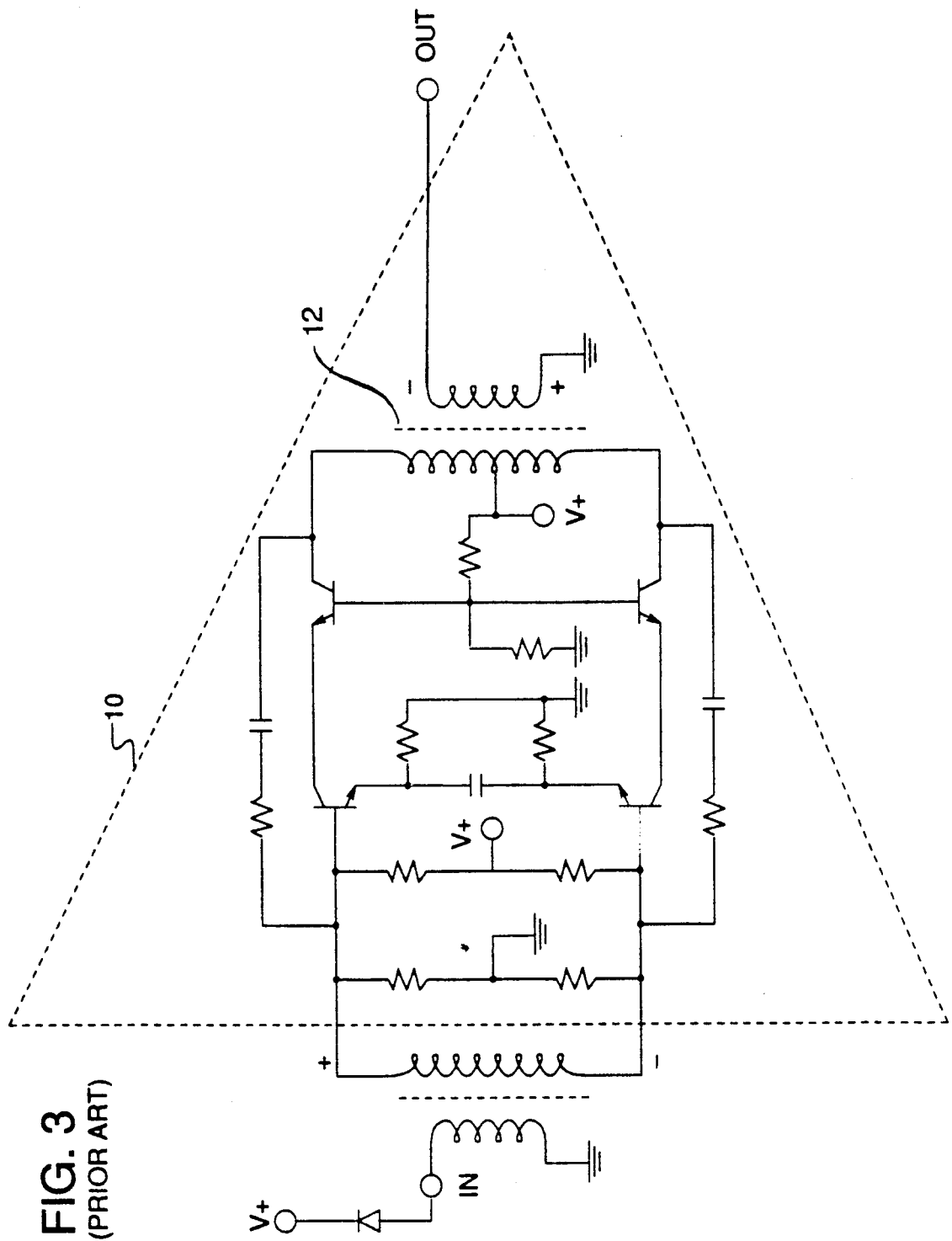
FIG. 3 shows a prior art lightwave receiver.

The amplifier 10 may be of conventional design. For example, the amplifier shown in FIG. 3, is suitable if a single-ended output is desired. A balanced output is alternatively possible by replacing the primary winding of transformer 12 with resistors. The inverting and non-inverting outputs are then taken from the collectors of the two output transistors. A typical balanced amplifier circuit for CATV applications provides a transimpedance of 600 ohms, and a frequency response of 50 to 550 MHz, with a noise level of 5 picoamps per $Hz^{\frac{1}{2}}$.

The pathodiode D1 in the illustrative embodiment is an InP/InGaAs p-i-n photodiode that is responsive in the region of 1.0 to 1.6 micrometers. That type of photodetector has low noise and can be highly linear, making it suitable for the analog modulation techniques used in certain types of lightwave transmission systems. However, other materials and other photodetector types are possible. For example, an avalanche photodiode may be used, with typically a higher bias voltage than that used with a p-i-n photodiode. Phototransistors are also known in the art, and may be used by connecting the collector to one input. and the emitter to the other input of the balanced amplifier. The base may be connected to an input, or left floating. Photoconductors are also known in the art, and may be used. Still other types of photodetectors may be used with the present invention.

Figure 2:
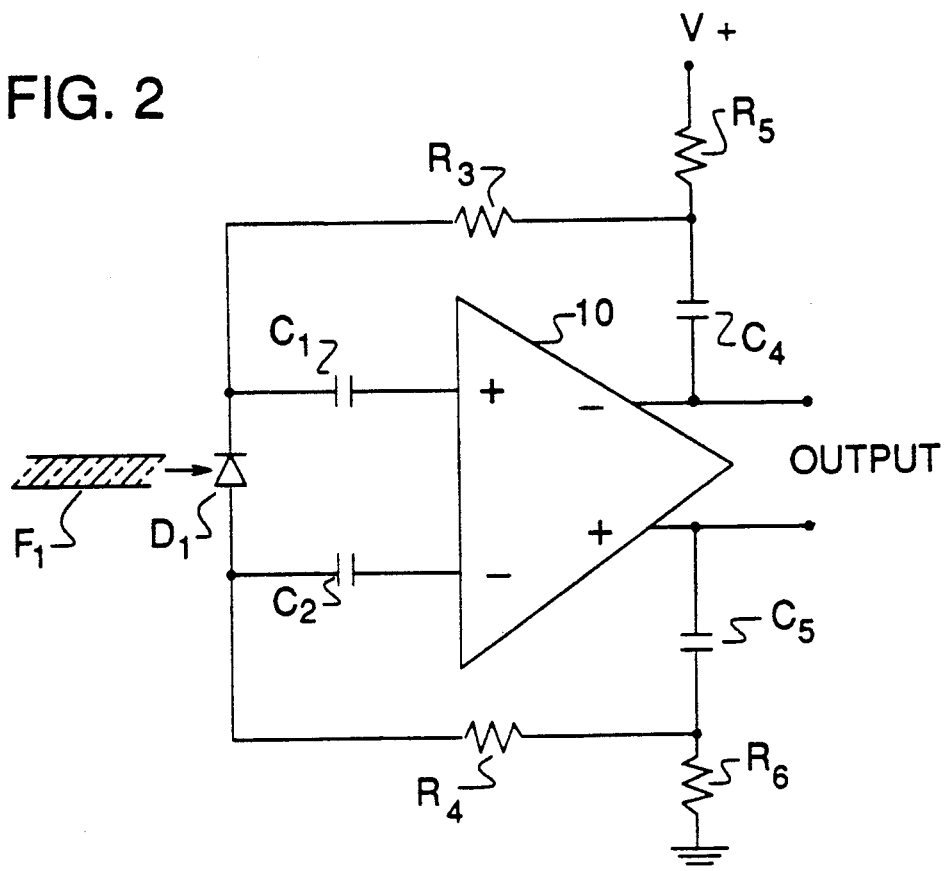
FIG. 2 shows an alternative embodiment of the invention.

Another alternative embodiment of the present invention is shown in FIG. 2. In that case, the positive bias voltage is supplied to the cathode of D1 through R3 and R5, whereas the negative bias voltage is supplied to the anode of D1 through R4 and R6. The resistors R3 and R4 are feedback resistors, typically chosen to obtain proper amplifier gain, while feedback capacitors C4 and C5 determine the upper frequency response. The resistors R5 and R6 then serve to set the proper DC bias level for D1. This arrangement has the advantage that the effective input resistances of R3 and R4 are reduced by the Miller effect. Hence, larger resistor values may be used, with an associated reduction in receiver thermal noise.

The low distortion and high performance of the present receiver are advantageous in a variety of lightwave system applications. For example, trunk repeaters may use this receiver. In that case, the receiver output may be coupled to driver circuitry for modulating a laser that is optically coupled to another optical fiber. Alternatively, the inventive receiver may be located at customer premises for receiving lightwave signals carrying television, data, facsimile, or other types of information. In that case, the receiver output may be connected directly to a television set input, or else to demodulation circuitry for supplying computers or other types of information processing equipment with the transmitted information.

I claim:

1. A lightwave receiver comprising a photodetector capacitively coupled to first and second differential inputs of an amplifier having first and second outputs, and further comprising means for supplying a DC bias voltage to said photodetector; characterized in that said means for supplying a DC bias voltage comprises a first feedback resistor connected from said first input to a first output of said amplifier, and a second feedback resistor connected from said second input to a second output of said amplifier.

2. The lightwave receiver of claim 1 wherein said photodetector is a photodiode, the cathode of said photodiode is coupled to said first input through a first capacitor, and the anode of said photodiode is coupled to said second input through a second capacitor.

3. The lightwave receiver of claim 1 wherein said first resistor and said second resistor have equal resistance values.

4. A lightwave receiver comprising a photodetector capacitively coupled to first and second differential inputs of an amplifier having first and second outputs, and further comprising means for supplying a DC bias voltage to said photodetector;
characterized in that said means for supplying a DC bias voltage comprises a first inductor connected between said first input and a positive DC power supply conductor, and a second inductor connected between said second input and a negative DC power supply conductor.

5. The lightwave receiver of claim 4 wherein said photodetector is a photodiode, the cathode of said photodiode is coupled to said first input through a first capacitor, and the anode of said photodiode is coupled to said second input through a second capacitor.

6. The lightwave receiver of claim 4 wherein said means for supplying a DC bias voltage further comprises a first resistor connected between said first input and a positive DC power supply conductor, and a second resistor connected between said second input and a negative DC power supply conductor.

7. The lightwave receiver of claim 6 wherein said first resistor and said second resistor have equal resistance values.

* * * * *